Patented Jan. 8, 1929.

1,697,870

UNITED STATES PATENT OFFICE.

SIDNEY MARION HULL, OF WAUKESHA, WISCONSIN, ASSIGNOR TO WESTERN ELECTRIC COMPANY, INCORPORATED, OF NEW YORK, N. Y., A CORPORATION OF NEW YORK.

INSULATING COMPOSITION AND METHOD OF FORMING THE SAME.

No Drawing.  Application filed September 21, 1923. Serial No. 664,081.

This invention relates to improvements in insulating compositions and a method of forming the same.

The object of the invention is to provide for wires or other electrical conductors an insulating coating which has good adherence, a high degree of elasticity, a wide range of baking temperature, a high dielectric strength, and one that is very inert to organic solvents and fluxing agents.

Another object of the invention is to provide an insulating coating having the above enumerated properties, and in addition is of such consistency that its color changes with increased extent of baking, which serves to some degree as a control of the baking process and renders inspection of the coated wire more facile.

An insulating composition made in accordance with the invention comprises essentially a cellulose derivative, a synthetic resin and furfural as a solvent, baked at a temperature considerably higher than that necessary to dry the coating.

In accordance with the present invention, a cellulose ester, such as cellulose acetate, cellulose nitrate, etc., or mixture thereof, is brought into solution with any suitable synthetic resin, preferably a phenolic condensation product, such as may be produced from phenol and hexamethylenetetramine or from phenol, an aldehyde and a suitable catalyst, such as sodium carbonate, hydrochloric, oxalic or acetic acids, etc. by means of an appropriate solvent, such as furfural, or a combination of solvents, such as furfural and phenol, to produce an insulating material having the aforementioned desirable qualities.

In the preferred manner of practicing the invention, cellulose acetate, 30 parts by weight is dissolved in a mixture of furfural, 300 parts by weight, and phenol, 15 parts by weight. A phenolic resin, such as "Redmanol 200–A", 10 parts by weight, is dissolved in a mixture of denatured alcohol, 100 parts by weight, and acetone, 250 parts by weight. The acetonealcohol solution is then thoroughly mixed with the cellulose acetate-furfural-phenol solution.

It is also possible to form the synthetic resin in the insulating solution directly, by adding the proper ingredients and then subjecting the mixture to a requisite heat treatment. When this method of preparing the material is followed, cellulose acetate, 30 parts by weight, phenol, 15 parts by weight, hexamethylenetetramine, 2.5 parts by weight, and furfural, 300 parts by weight, are mixed together and heated at a temperature around 115° C. for a period of from two to four hours.

A quantity of camphor equal to the weight of phenol may be added, this ingredient tending to increase the elasticity and smoothness of the insulating coating. In place of camphor, "Halowax," triacetin, phenacetin, or tri-phenyl phosphate may be employed.

When the insulating material is applied to a wire by an immersion process it is preferable to thin it with a suitable solvent or diluent, such as acetone or ethyl alcohol, or mixtures of solvents or diluents, such as alcohol and highflash naphtha, or any other solvent or combination of solvents having low viscosity and surface tension.

Experiments have shown that the temperature to which an insulating material containing a cellulose derivative as a base is subjected, determines to a large extent the adhesiveness of the material to the wire, and also the inertness of the material to solvents. It has been found preferable to bake the insulating coating at a temperature considerably above that necessary to dry the coating. Successful coatings have been produced on 30 gauge wire by baking at an effective oven temperature ranging between 465° F. as an approximate minimum, and 715° F. as an approximate maximum where the wire moves through the oven at approximately 16 feet per minute. The oven temperature will necessarily be varied, depending both upon the size of the wire and the speed at which the wire passes through the oven.

A composition made in accordance with the invention has a light tan color which becomes deeper as the baking operation progresses. Thus the color of the coating is indicative of the amount of baking to which it is subjected and renders the control of the baking apparatus and the inspection of the coating extremely facile.

What is claimed is:

1. An insulating coating composition comprising cellulose acetate, 30 parts by weight, a phenolic condensation product, 10 parts by weight, and furfural, 300 parts by weight.

2. An insulating coating composition comprising cellulose acetate, 30 parts by weight, a phenolic condensation product, 10 parts by weight, furfural, 300 parts by weight, and phenol, 15 parts by weight.

In witness whereof, I hereunto subscribe my name this 31st day of August A. D., 1923.

SIDNEY MARION HULL.